US011138386B2

(12) United States Patent
Chen et al.

(10) Patent No.: US 11,138,386 B2
(45) Date of Patent: Oct. 5, 2021

(54) RECOMMENDATION AND TRANSLATION OF SYMBOLS

(71) Applicant: International Business Machines Corporation, Armonk, NY (US)

(72) Inventors: Sharon Chen, New Taipei (TW); Jin Shi, Ningbo (CN); Chao Yuan Huang, Taipei (TW); Pei-Yi Lin, New Taipei (TW)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/680,536

(22) Filed: Nov. 12, 2019

(65) Prior Publication Data

US 2021/0141866 A1    May 13, 2021

(51) Int. Cl.
*G06F 40/30* (2020.01)
*H04L 12/58* (2006.01)
*G06F 3/0484* (2013.01)

(52) U.S. Cl.
CPC .......... *G06F 40/30* (2020.01); *G06F 3/04842* (2013.01); *H04L 51/02* (2013.01); *H04L 51/16* (2013.01)

(58) Field of Classification Search
CPC ..... G06F 40/30; G06F 3/04842; H04L 51/16; H04L 51/02
See application file for complete search history.

(56) References Cited

U.S. PATENT DOCUMENTS

| 7,966,003 | B2 | 6/2011 | Longe et al. | |
| 8,290,478 | B2 * | 10/2012 | Shim | G06Q 10/107 455/414.4 |
| 8,473,443 | B2 * | 6/2013 | Lewis | G06Q 10/107 706/47 |
| 8,739,031 | B2 * | 5/2014 | Cheung | G06F 40/169 715/261 |
| 8,930,481 | B2 * | 1/2015 | Zhang | H04L 51/02 709/206 |

(Continued)

FOREIGN PATENT DOCUMENTS

WO    2013037033 A1    3/2013

OTHER PUBLICATIONS

Emoji Compatibility, Nov. 6, 2018, 20 pages (Year: 2018).*

(Continued)

*Primary Examiner* — Yongjia Pan
(74) *Attorney, Agent, or Firm* — Jared C. Chaney (57) ABSTRACT

Aspects of the present disclosure relate to recommendation and translation of symbols. In some embodiments, the method includes receiving current text data from a sender, receiving a first set of historical text data for the sender, determining emoji use preference of the sender, analyzing the current text data for context that is representable by an emoji, selecting a first emoji based the context and the first set of historical text data, receiving a second set of historical text data for a recipient of the current text data, analyzing a contextual meaning of the selected emoji based on the first set of historical text data and the second set of historical text data, determining, based on the analyzing the contextual meaning of the selected emoji, that a second emoji would more closely match the context of the current text data, and sending the second emoji to the recipient.

17 Claims, 6 Drawing Sheets

(56) References Cited

U.S. PATENT DOCUMENTS

| | | | |
|---|---|---|---|
| 9,002,847 B2 | 4/2015 | Eliassaf | |
| 9,043,196 B1* | 5/2015 | Leydon | G06F 3/04842 704/4 |
| 9,414,779 B2* | 8/2016 | Kanevsky | G10L 25/63 |
| 9,613,023 B2* | 4/2017 | Kennard | G06F 40/242 |
| 9,705,908 B1* | 7/2017 | Thakurta | G06N 20/00 |
| 9,721,024 B2* | 8/2017 | Sa | G06F 16/9535 |
| 10,387,574 B1* | 8/2019 | Anders | G06F 40/30 |
| 2007/0266090 A1* | 11/2007 | Len | G06F 40/103 709/204 |
| 2013/0103766 A1* | 4/2013 | Gupta | G06Q 10/107 709/206 |
| 2014/0088954 A1* | 3/2014 | Shirzadi | G06F 40/166 704/9 |
| 2014/0380169 A1 | 12/2014 | Eldawy | |
| 2015/0100537 A1* | 4/2015 | Grieves | G06N 5/048 706/52 |
| 2015/0205828 A1 | 7/2015 | Manciero et al. | |
| 2015/0221305 A1 | 8/2015 | Sharifi | |
| 2015/0222586 A1* | 8/2015 | Ebersman | G06F 3/04817 715/752 |
| 2015/0222617 A1* | 8/2015 | Ebersman | G06F 40/169 726/4 |
| 2016/0179967 A1* | 6/2016 | Sa | G06F 16/3346 707/730 |
| 2016/0306438 A1* | 10/2016 | Kehoe | G06F 3/0482 |
| 2017/0083491 A1 | 3/2017 | Kumhyr et al. | |
| 2017/0177554 A1* | 6/2017 | Emmons | H04L 51/063 |
| 2017/0180276 A1* | 6/2017 | Gershony | H04L 51/02 |
| 2017/0185581 A1* | 6/2017 | Bojja | G06K 9/6269 |
| 2018/0083901 A1* | 3/2018 | Mcgregor, Jr. | G06K 9/726 |
| 2018/0255009 A1 | 9/2018 | Chen et al. | |
| 2018/0366119 A1* | 12/2018 | Li | G06F 3/167 |
| 2020/0110794 A1* | 4/2020 | Vos | G06F 40/166 |
| 2020/0210990 A1* | 7/2020 | Laracey | H04L 51/10 |
| 2020/0380199 A1* | 12/2020 | Judovsky | H04L 51/10 |

OTHER PUBLICATIONS

Meghan Neal, What the Emoji You're Sending Actually Look Like to Your Friends, Nov. 12, 2015, 6 pages (Year: 2015).*

Sébastien Page, How to know what an emoji means, Oct. 22, 2015, 7 pages (Year: 2015).*

Anonymous, "A cognitive emoji recommendation method," ip.com, An IP.com Prior Art Database Technical Disclosure, IP.com No. IPCOM000251630D, IP.com Electronic Publication Date: Nov. 20, 2017, 5 pages.

"CLDR—Unicode Common Locale Data Repository; Characters Names and Keywords (Emoji)," Unicode, Printed Jul. 17, 2019, 1 pages, http://unicode.org/emoji/charts/emoji-annotations.html.

"Emoji List, v12.0," Emoji Charts, Printed May 31, 2019, 108 pages, http://unicode.org/emoji/charts/emoji-list.html.

"CLDR—Unicode Common Locale Data Repository," Printed May 31, 2019, 5 pages http://unicode.org/cldr/charts/dev/annotations/index.html.

Mell et al., "The NIST Definition of Cloud Computing," Recommendations of the National Institute of Standards and Technology, U.S. Department of Commerce, Special Publication 800-145, Sep. 2011, 7 pages.

* cited by examiner

RECOMMENDATION AND TRANSLATION OF SYMBOLS

BACKGROUND

The present disclosure relates generally to the field of text suggestion, and more particular aspects of the disclosure relate to recommendation and translation of symbols.

Messaging interfaces may display text and symbols (such as emojis). Traditional interfaces are limited in the aspects in which they can suggest and translate symbols. Emoji are ideograms and smileys used in electronic messages and web pages. Emoji exist in various genres, including facial expressions, common objects, places and types of weather, and animals. They are much like emoticons, but emoji are actual pictures instead of typographics.

SUMMARY

The present disclosure provides a method, computer program product, and system of recommending and translating emoji. In some embodiments, the method includes receiving current text data from a sender, receiving a first set of historical text data for the sender, determining emoji use preference of the sender, analyzing the current text data for context that is representable by an emoji, selecting a first emoji based the context and the first set of historical text data, receiving a second set of historical text data for a recipient of the current text data, analyzing a contextual meaning of the selected emoji based on the first set of historical text data and the second set of historical text data, determining, based on the analyzing the contextual meaning of the selected emoji, that a second emoji would more closely match the context of the current text data, and sending the second emoji to the recipient.

DETAILED DESCRIPTION

Emojis are often used in text compositions to express emotion, feeling, or state of mind. While an emoji can indicate one meaning in one region or society, in another region or society the same emoji can indicate something entirely different. A plethora of emojis are available across technology platforms and messaging programs. Emojis can be happy faces, sad faces, flowers, depictions of people, depictions of animals, or any other pictures used in the place of one or more words in text.

The interpretation of emojis can be influenced by regional profile, the sender's personal preference, and the recipient's own personal preference. When texting with emojis, the meaning behind them can become confusing and lead to misunderstandings. For example, one sender's version of a smile may be a recipient's version of a shocked expression. Another sender's version of a laugh may be a recipient's version of a nervous face. As the world becomes more connected through technology people with different regions and languages begin to interact more. Emojis will likely continue to be an important part of communications between people. Thus, having a solution to resolve misunderstandings and misinterpretations of the emojis may prevent problems and misunderstandings.

Translators can interpret words into different languages to assess the best term that matches a word in one language to another. However, these methods can sometimes provide unintended, erroneous translations causing misunderstandings between people in different parts of the world. For example, an online translator program can completely change the meaning of a sentence when translating the sentence from one language to another. In some embodiments, to bridge this gap, a translator that deciphers the significance of an emoji in one region or for one person's profile to determine a meaning of the emoji. In some embodiments, once the meaning of the emoji is determined, its equivalent in another region can be determined.

Embodiments of the present disclosure describe a method of translating symbols used in conversation using a personal profile (e.g. regional background, personal characteristics, regional characteristics, and/or emoji use preferences). Some embodiments analyze a string of text, such as a message, that is written by the sender, recommend an emoji to the user (sender or recipient of a text) based on the sender's preferences or regional profile, and then translate the emoji for the recipient based off of the recipient's preferences or regional profile.

Figure 1:
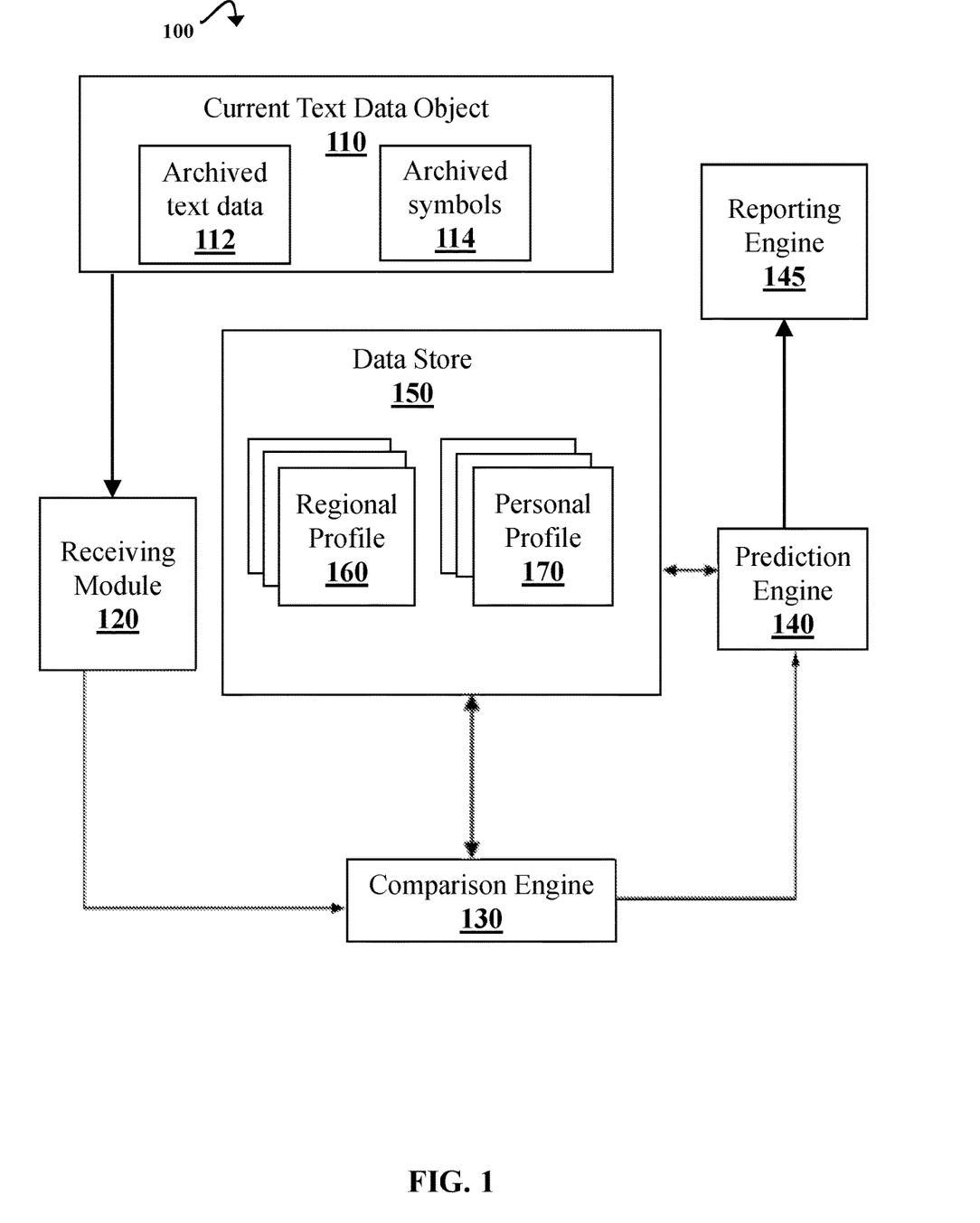
FIG. 1 is a system diagram illustrating example embodiments of the present disclosure.

FIG. 1 is a block diagram illustrating an emoji translation system 100 according to one illustrative embodiment. The emoji translation system 100 includes a current text data object 110 with archived text data 112 and archived symbols 114, a receiving module 120, a comparison engine 130, a data store 150 with regional profile 160 and personal profile 170, a prediction engine 140, and reporting engine 145.

In some embodiments, the receiving module 120 may receive text data in current text data object 110. In some embodiments, archived text data is retrieved from user programs (e.g., chat history from a texting). In some embodiments, the archived text data will include emoji data. Current text data object 110 may include historical data (e.g. prior messages the user sent from a given app or device) that corresponds to the user's preferences of emojis for different words. Accordingly, the emoji translator system 100 may use the current text data object 110 to select which text data and archived symbols are predictive of an emoji specific to the conversation. In some embodiments, the data may be stored and/or transmitted over the cloud.

In some embodiments, selection of the predictive text data and archived symbol data elements can include collecting a user's prior conversation history from their emails, SNS history or chats. In some embodiments, these histories are often stored on the cloud.

In some embodiments, a comparison engine 130 compares archived text data 112 and archived symbols 114. In some embodiments, comparison engine 130 creates domains such as regional profile 160. A regional profile consists of the user's region and other characteristics relevant to their region such as language or dialect spoken, culture, customs, media trends, etc. The comparison engine 130 compares the archived text data 112 to archived symbols 114 and stores the models in data store 150. In some embodiments, the emoji translator system 100 uses the regional profile 160 to predict which emoji would fit the text data in light of the conversation context and the comparison made by comparison engine 130. In some embodiments, prediction engine 140 performs the prediction of a recommended emoji for the sender based off the comparison, text data, and archived symbols. For example, prediction engine 140 may determine that a user that picks a smiley face showing teeth when laughing and may suggest a smiley face showing teeth and braces when a user types "Ha, I just got braces."

In some embodiments, comparison engine 130 compares archived text data 112 and archived symbols 114. In some embodiments, comparison engine 130 creates personal profiles (e.g. user's personal characteristics and information about the user's text habits), such as personal profile 170, from the comparison and stores the personal profile 170 in data store 150. In some embodiments, the emoji translator system 100 uses the personal profile to predict an emoji recommendation. In some embodiments, prediction engine 140 performs the prediction of the translated emoji. In some embodiments, personal profile 170 is based on a history of text data from a specific user. In some embodiment, personal profile 170 is based on preferences that a user has provided. For example, a user may fill out a questionnaire stating the user's preferred emojis.

In some embodiments, report engine 145 generates a report describing the prediction of a translated emoji. In some embodiments, the report engine 145 displays a predicted emoji for the recipient. In some embodiments, the suggested emoji will be displayed on the user's display. In some embodiments, several emojis will be displayed for the user to choose from.

As new text data is discovered or analyzed, the new text data and the corresponding features may be added to data store 150, thus more models may be added to regional profile 160 and personal profile 170. For example, when multiple users in a region start using a new emoji, the new emoji and its usage may be added to regional profile 160 or when a user starts using a new emoji, the results of comparison engine 130 may be added to personal profile 170.

Figure 2:
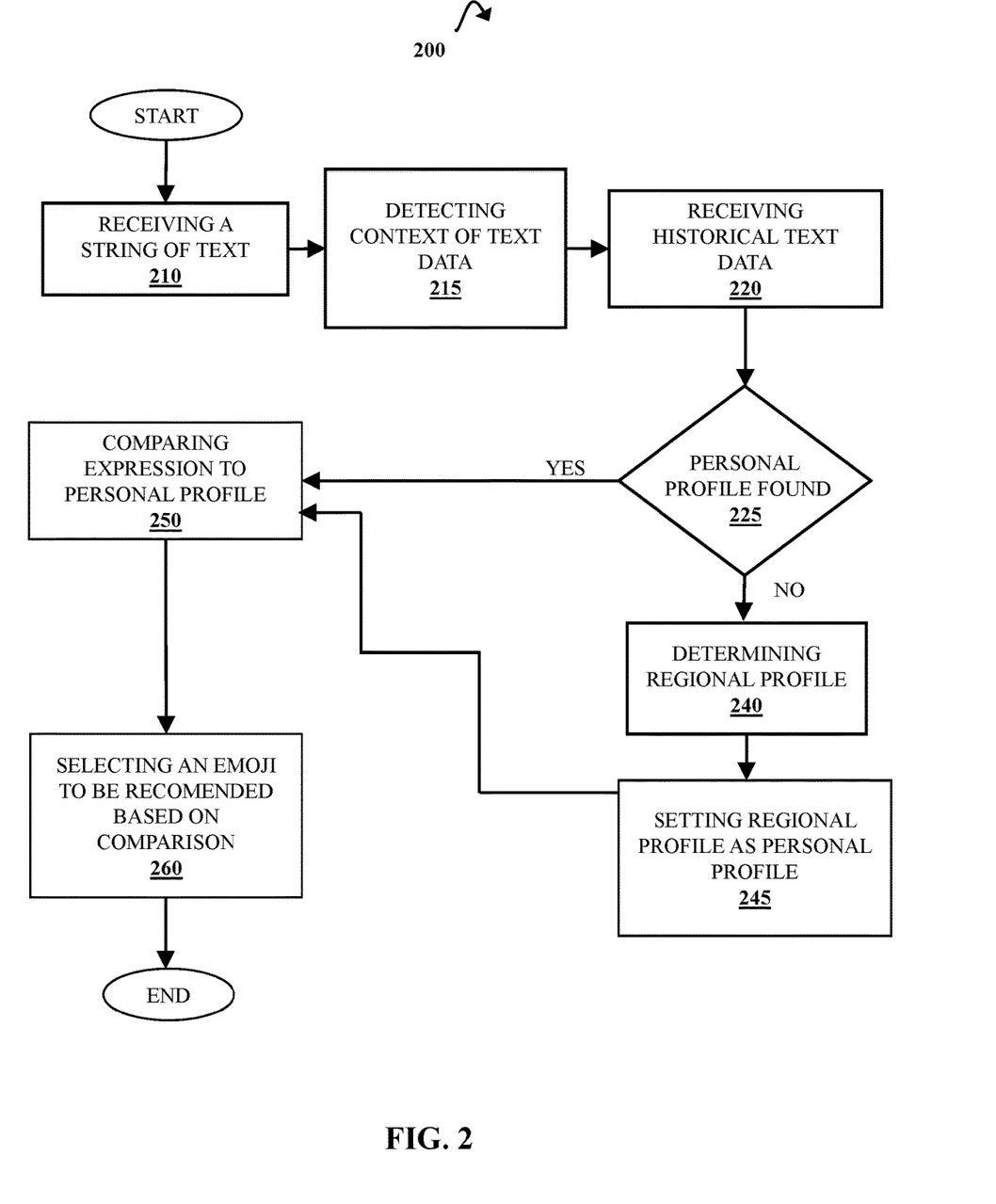
FIG. 2 is a flow diagram illustrating an example process of recommending an emoji according to some embodiments.

FIG. 2 illustrates an example flowchart of a method 200 a system may use for recommendation of an emoji, in accordance with embodiments of the present disclosure. At block 210, current text data (e.g., a string of text, a text message, a message, an email, a text, etc.) is received. In some embodiments, the current text data is a message written by the sender. In some embodiments, the current text data includes multiple messages from a first user and/or a second user. For example, a first user might send a text saying, "I am so excited for the game," and the second user may say, "I love basketball."

At 215, the text data is analyzed for its conversation context (e.g. the tone, intended meaning, and wording of a conversation between two people) that may be expressed in emojis. Following the previous example, the system may tag excited and love as contextual words describing emotions that may be expressed as emojis. The system might also tag game and basketball as contextual words that affect the emotional words. Thus, excited may be characterized by both game and basketball. Similarly, love may be characterized by basketball to give the meaning "enjoyment of an activity." In some embodiments, the tagged text data includes emojis. For example, if the user selects an emoji with soccer eyes, the system may select the soccer eye emoji when the conversation indicates the sender is talking about basketball.

At 220, historical text data is received. In some embodiments, the historical data is a personal profile or a regional profile. In some embodiments, the historical text data is a communication history for a user. In some embodiments, a personal profile is created from the historical text data. For example, the personal profile may include how often a user includes an emoji in a text message and what the message context is when the user uses the emoji.

In some embodiments, the historical text data is message history for a plethora of users in a region. In some embodiments, a regional profile is made using the historical text data. For example, the regional profile may include emoji trends in the area, how often some emojis are used, and what the regional meaning for each emoji is.

At 225, the method then checks to see if a personal profile of the sender is available. In some embodiments, personal profile may include chat history (e.g. previous messages where emojis were used stored in the cloud), user preferences for emojis (e.g. a tendency of the user to use one or more emojis in place of one or more respective tag words), and/or personal characteristics to see if there are preferences for the text's context. For example, if a user likes to talk about dogs and use dog emojis. In some embodiments, the preferences for emojis will be categorized by users. For example, a user might be more likely to display one emotion to a mother and different emotion to a brother. In some embodiments, the personal characteristics might be categorized by type of emotion. For example, happy emotions might be linked with dog emojis, while angry emotions might be linked to dragon emojis. In some embodiments, the data to create a personal profile for a sender is stored in a cloud, which is then retrieved for the personal profile at 230.

At 240, a regional profile is determined (e.g. a region's characteristics). In some embodiments, the data used for a regional profile is retrieved from a database stored over a cloud. In some embodiments, the regional profile is an agglomerate of users near a sender's location. In some embodiments, the regional profile may also be based on other users with a similar age, interest group, or work. In some embodiments, the regional profile is based on an agglomerate of users with one or more commonalities. For example, users in a certain area attending a particular school may like basketball and therefore be more likely to choose basketball emojis.

At 245, the regional profile is set as the personal profile. In some embodiments, if no personal profile for a user is found, the regional profile, from block 240, will be used as a personal profile. In some embodiments, a personal profile will be merged with a regional profile to create a new personal profile. For example, after a user has moved to a new area, the user profile may be updated with emojis that are commonly used in that area.

At 250, the context of the text will be compared to the sender's personal profile. In some embodiments, the personal profile will be used to determine a personal preference of the sender. In some embodiments, the personal preference will detail what emojis a user (e.g., the sender or recipient) will use, how often the user will use those emojis, and in what conditions they will be used. For example, a user may use a smiley face with teeth 90% of the time to show happiness and use a smiley face with no teeth 10% of the time to show happiness. In some embodiments, personal preference may indicate types of emojis. For example, a user may use dragon emojis more than round yellow face emojis.

In some embodiments, personal preference may depend on who the user is texting with. For example, a user may text classmates different emojis than parents.

In some embodiments, a user may have multiple user profiles. In some embodiments, when multiple user profiles are found, the system may select the most relevant profile for use. For example, if there is one profile for when a sender is texting a mother and one profile for when a sender is texting a brother, the system may use the brother profile when the sender is texting a sister. In some embodiments, when multiple user profiles are found, the system may combine the most relevant profiles for use. For example, if there is one profile for when a sender is texting a mother and one profile for when a sender is texting a brother, the system may combine the profiles when the sender is texting a sister.

At 255, the method then compares the text data (e.g. identified string of text, word, chosen emoji, or recommended emoji) to the personal profile. In some embodiments, the conversation context is analyzed for tag words (e.g. happy, sad, hungry, angry) which can be expressed by emojis depending on the personal preferences or regional profile.

At 260, the comparison is used to recommend an emoji to the sender. In some embodiments the emoji is also tagged with metadata based on the text data used to recommend the emoji. For example, if the word happy was used by the system to select an emoji, the emoji may be tagged with the word happy. In some embodiments, emojis will be ranked by likelihood of use. For example, an emoji used 90% of the time may be presented first while an emoji used 10% of the time may be shown second. In some embodiments, the emojis must have a threshold level of likeliness to be used. For example, if a system determines that the user would only select an emoji 2% of the time, then the emoji will not be selected. In some embodiments, the recommending will be bypassed, and the emoji will be sent without prompting the sender.

Figure 3:
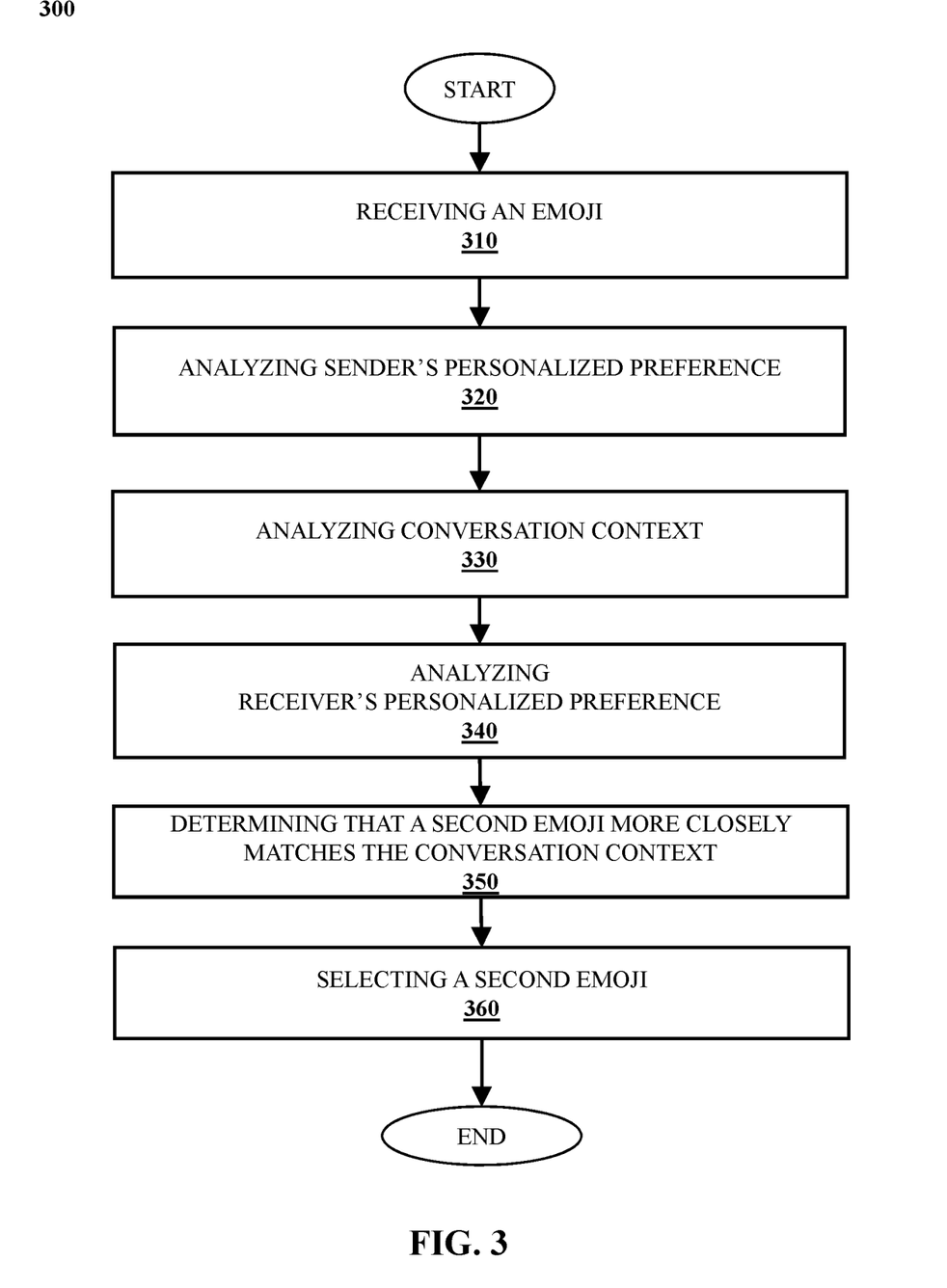
FIG. 3 is a flow diagram illustrating a process of translating an emoji according to some embodiments.

FIG. 3 illustrates a flowchart of method 300 which translates a received emoji, in accordance with the embodiments of the present disclosure. In some embodiments, the received emoji can be an emoji from FIG. 2.

At 310, a system receives an emoji. In some embodiments, the emoji received from a sender. In some embodiments, the emoji is received in a document. For example, the emoji may be part of a web page. In some embodiments, the emoji has been analyzed to determine the senders likely meaning of the emoji and the meaning has been included as meta data with the emoji. For example, if a user profile of a sender indicates that a smiley face with teeth showing represents happiness, the emoji may have a tag for happiness.

In some embodiments, the emoji is analyzed in view of the sender's personalized emoji use preferences at 320. In some embodiments, personalized preferences may include the sender's most frequently sent emojis, the context and conversations these emojis were used in, and the words the sender uses these emojis for. In some embodiments, personal preferences come from data (e.g., data that is stored/transferred using the cloud), determined by prior chat or text history. In some embodiments, a user's personal profile or regional profile (such as personal profile 170 and regional profile 160) are provided to the system. In some embodiments, the system will create a user's personal profile or regional profile and modify those profiles as the conversation progresses. For example, if a senders personal and regional profile are not provided, the system can use contextual clues to determine the sender's preferences.

At 330, the conversation context is assessed along with the recipient's personalized preference. In some embodiments, the meaning of the emoji is detected through the context of the text. In some embodiments, the meaning of the emoji is assessed using a profile for the sender that is provided to or determined by the system.

At 340, the recipient's personal profile will be analyzed to determine a translation of an emoji. In some embodiment, the recipient's personal preferences may be replaced by or may include the recipient's regional preferences. In some embodiments, the system may create a recipient's personal profile based on the text data and emoji usage during the conversation. In some embodiments, the system may determine that the emoji has a different meaning for the sender and the recipient, and thus the emoji needs to be changed. For example, a smiley face with no teeth showing may be selected to replace a smiley face with teeth in a case where a smiley face with teeth showing expresses laughing in the sender's region but expresses nervousness in the recipient's region. In some embodiments, the system may determine that a more relevant emoji is available to accurately describe the sender's intent. For example, a smiley face with star eyes may replace a smiley face with wide eyes if a smiley face with star eyes has been trending in a text recipient's region.

At 350, it is determined that an emoji more closely matches the context of the current text data. In some embodiments, a selected emoji will more closely match the context of the current text data with respect to a recipient's profile (e.g., a recipient's personalized preference). In some embodiments, a confidence score will be used to determine how closely an emoji matches the context data of the current text message or text string. The confidence score may be based on how many words in the text data match words in a definition of an emoji. In some embodiments, the closeness of the match will be determined by a comparison of a definition of the emoji and the context of the text. In some embodiments, the closeness of the match will be determined by how often the recipient uses an emoji with similar context. For example, in a situation where a sender is using the emoji to portray happiness, but the recipient has previously used the same emoji to portray nervousness; the system will select a different emoji that the recipient has used in a text with the word happy.

In some embodiments, the system will select an emoji without notifying the sender or recipient. In some embodiments, the sender and or recipient will be given a choice of emoji for the translation. In some embodiments, an explanation for each choice may be provided to the sender or the recipient. For example, a user may be shown a smiley face with star eyes and told a smiley face with star eyes is trending in the recipient's region. In some embodiments, the system will note the users selection to improve the user and regional profiles.

At 360 the translated emoji is selected. In some embodiments, the selecting includes sending the emoji to the recipient in a text message, replacing the received emoji. In some embodiments, the system will alert the recipient and or the sender that the emoji has been translated. For example, the emoji may be underlined. In some embodiments, the system will display both emojis. For example, the translation may be shown as a normal tone and the original emoji may be slightly faded. In some embodiments, the meaning behind the emoji may be displayed. For example, the meaning may pop up when the emoji is tapped or hovered over. For example, when tapped, the emoji may show a meaning for a sender's region and a recipient's region.

Figure 4:
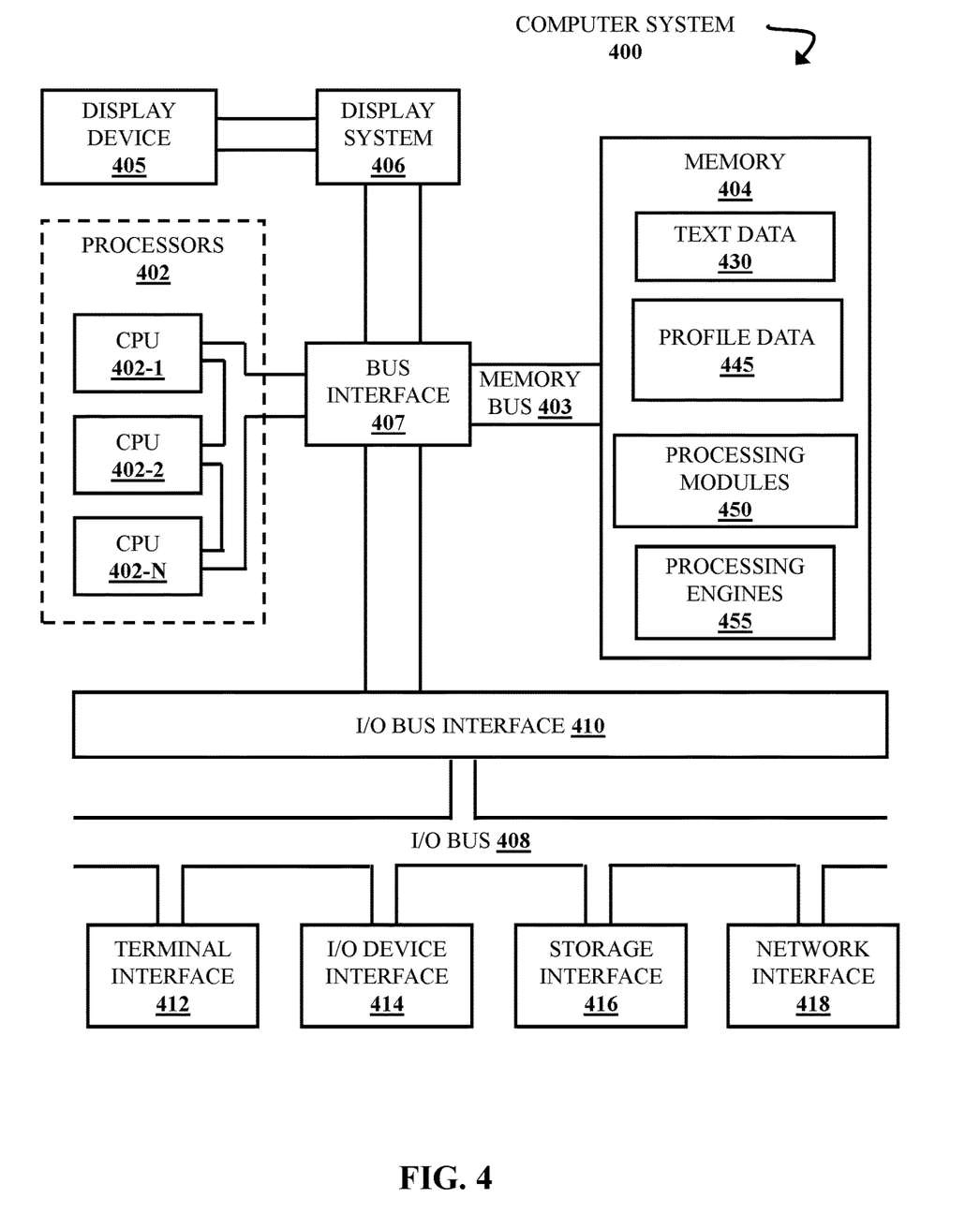
FIG. 4 is a block diagram illustrating a computer system, according to some embodiments of the present disclosure.

FIG. 4 is a high-level block diagram illustrating an exemplary computer system 400 that can be used in implementing one or more of the methods, tools, components, and any related functions described herein (e.g., using one or more processor circuits or computer processors of the computer). In some embodiments, the major components of the computer system 400 comprise one or more processors 402, a memory subsystem 404, a terminal interface 412, a storage interface 416, an input/output device interface 414, and a network interface 418, all of which can be communicatively coupled, directly or indirectly, for inter-component communication via a memory bus 403, an input/output bus 408, bus interface unit 407, and an input/output bus interface unit 410.

The computer system 400 contains one or more general-purpose programmable central processing units (CPUs) 402-1, 402-2, and 402-N, herein collectively referred to as the CPU 402. In some embodiments, the computer system 400 contains multiple processors typical of a relatively large system; however, in other embodiments the computer system 400 can alternatively be a single CPU system. Each CPU 402 may execute instructions stored in the memory subsystem 410 and can include one or more levels of on-board cache.

The memory 404 can include a random-access semiconductor memory, storage device, or storage medium (either volatile or non-volatile) for storing or encoding data and programs. In some embodiments, the memory 404 represents the entire virtual memory of the computer system 400, and may also include the virtual memory of other computer systems coupled to the computer system 400 or connected via a network. The memory 404 is conceptually a single monolithic entity, but in other embodiments the memory 404 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory can be further distributed and associated with different CPUs or sets of CPUs, as is known in any of various so-called non-uniform memory access (NUMA) computer architectures. The memory 404 may include text data 430, profile data 445, processing modules 450, and/or processing engines 455 (Such as current text data object 110 with archived text data 112 and archived symbols 114, receiving module 120, comparison engine 130, data store 150 with regional profile 160 and personal profile 170, prediction engine 140, and reporting engine 145, illustrated in FIG. 1).

These components are illustrated as being included within the memory 404 in the computer system 400. However, in other embodiments, some or all of these components may be on different computer systems and may be accessed remotely, e.g., via a network. The computer system 400 may use virtual addressing mechanisms that allow the programs of the computer system 400 to behave as if they only have access to a large, single storage entity instead of access to multiple, smaller storage entities. Thus, though the text data 430, profile data 445, processing modules 450, and/or processing engines 455 are illustrated as being included within the memory 404, components of the memory 404 are not necessarily all completely contained in the same storage device at the same time. Further, although these components are illustrated as being separate entities, in other embodiments some of these components, portions of some of these components, or all of these components may be packaged together.

In an embodiment, the processing modules 450 and/or processing engines 455 execute on the processor 402 or instructions that are interpreted by instructions that execute on the processor 402 to carry out the functions as further described in this disclosure. In another embodiment, processing modules 450 and/or processing engines 455 are implemented in hardware via semiconductor devices, chips, logical gates, circuits, circuit cards, and/or other physical hardware devices in lieu of, or in addition to, a processor-based system. In another embodiment, the text data 430, profile data 445, processing modules 450, and/or processing engines 455 include additional instructions.

Although the memory bus 403 is shown in FIG. 4 as a single bus structure providing a direct communication path among the CPUs 402, the memory subsystem 410, the display system 406, the bus interface 407, and the input/output bus interface 410, the memory bus 403 can, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the input/output bus interface 410 and the input/output bus 408 are shown as single respective units, the computer system 400 may, in some embodiments, contain multiple input/output bus interface units 410, multiple input/output buses 408, or both. Further, while multiple input/output interface units are shown, which separate the input/output bus 408 from various communications paths running to the various input/output devices, in other embodiments some or all of the input/output devices may be connected directly to one or more system input/output buses.

The computer system 400 may include a bus interface unit 407 to handle communications among the processor 402, the memory 404, a display system 406, and the input/output bus interface unit 410. The input/output bus interface unit 410 may be coupled with the input/output bus 408 for transferring data to and from the various input/output units. The input/output bus interface unit 410 communicates with multiple input/output interface units 412, 414, 416, and 418, which are also known as input/output processors (IOPs) or input/output adapters (IOAs), through the input/output bus 408. The display system 406 may include a display controller. The display controller may provide visual, audio, or both types of data to a display device 405. The display system 406 may be coupled with a display device 405, such as a standalone display screen, computer monitor, television, or a tablet or handheld device display. In alternate embodiments, one or more of the functions provided by the display system 406 may be on board a processor 402 integrated circuit. In addition, one or more of the functions provided by the bus interface unit 407 may be on board a processor 402 integrated circuit.

In some embodiments, the computer system 400 is a multi-user mainframe computer system, a single-user system, or a server computer or similar device that has little or no direct user interface, but receives requests from other computer systems (clients). Further, in some embodiments, the computer system 400 is implemented as a desktop computer, portable computer, laptop or notebook computer, tablet computer, pocket computer, telephone, smartphone, network switches or routers, or any other appropriate type of electronic device.

It is noted that FIG. 4 is intended to depict the representative major components of an exemplary computer system 400. In some embodiments, however, individual components may have greater or lesser complexity than as represented in FIG. 4, Components other than or in addition to those shown in FIG. 4 may be present, and the number, type, and configuration of such components may vary.

In some embodiments, the data storage and retrieval processes described herein may be implemented in a cloud computing environment, which is described below with respect to FIGS. 5 and 6. It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
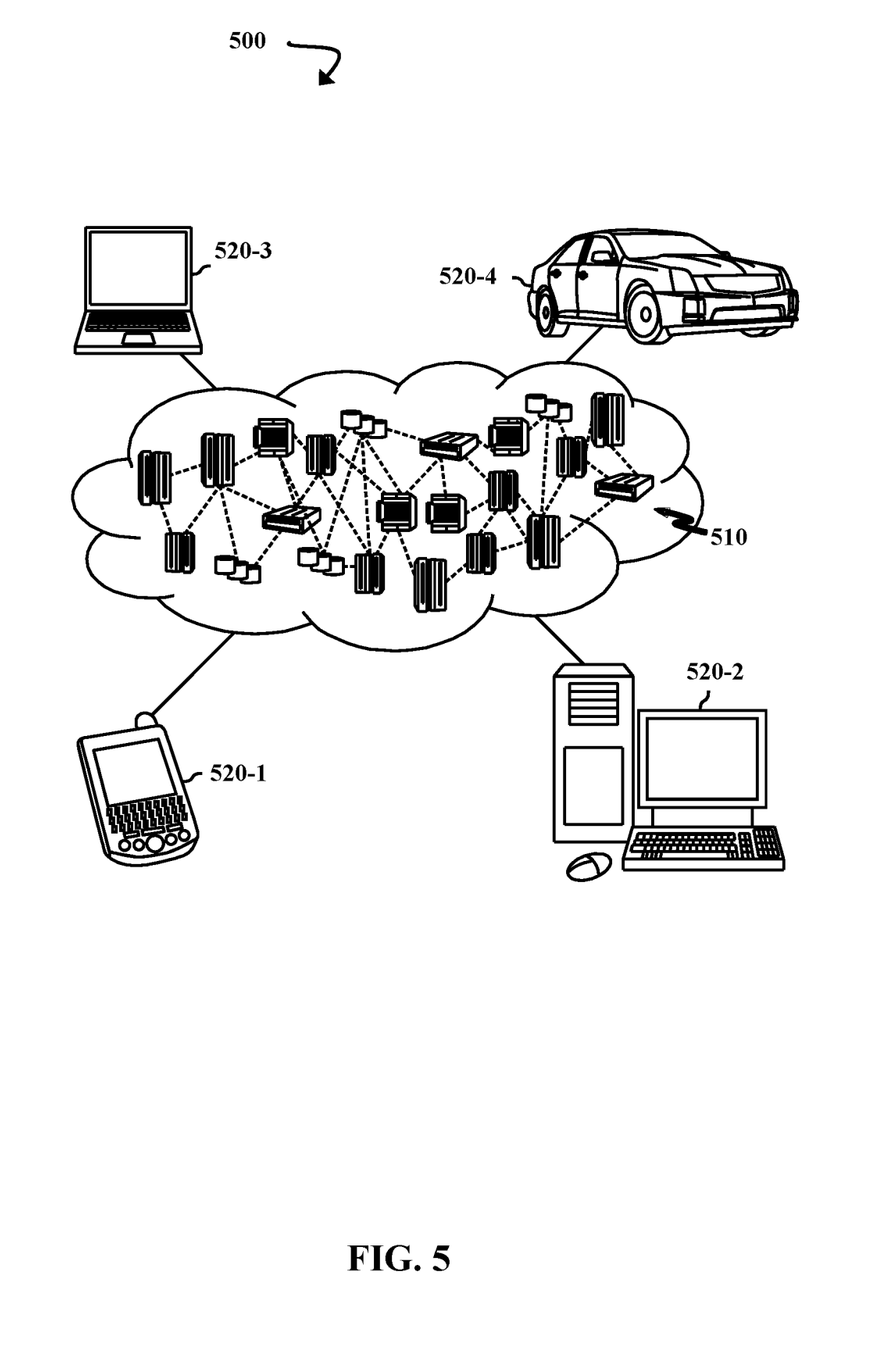
FIG. 5 is a block diagram illustrating a cloud computing environment, according to some embodiments of the present disclosure.

FIG. 5 is a block diagram illustrating a cloud computing environment 500, according to some embodiments of the present disclosure. As shown, cloud computing environment 500 includes one or more cloud computing nodes 510 with which local computing devices used by cloud consumers, such as, for example, a personal digital assistant (PDA) or cellular telephone 520-1, a desktop computer 520-2, a laptop computer 520-3, processing modules 450, and/or processing engines 455 (illustrated in FIG. 4), and/or an automobile computer system 520-4 may communicate. Nodes 510 may communicate with one another. They may be grouped (not shown) physically or virtually, in one or more networks, such as Private, Community, Public, or Hybrid clouds as described hereinabove, or a combination thereof. This allows cloud computing environment 500 to offer infrastructure, platforms and/or software as services for which a cloud consumer does not need to maintain resources on a local computing device. It is understood that the types of computing devices 520-1-520-4 shown in FIG. 5 are intended to be illustrative only and that computing nodes 510 and cloud computing environment 500 can communicate with any type of computerized device over any type of network and/or network addressable connection (e.g., using a web browser).

Figure 6:
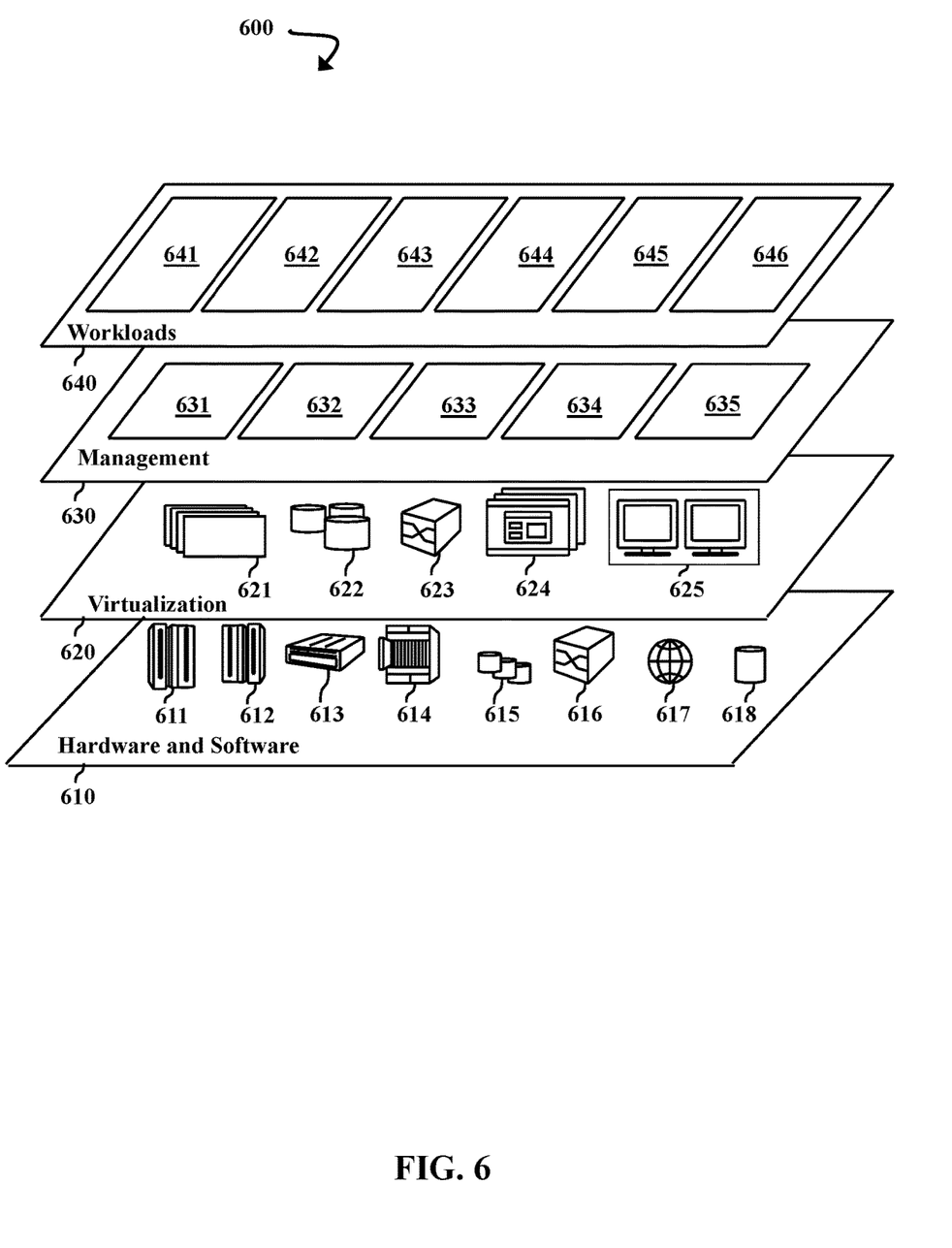
FIG. 6 is a block diagram illustrating a set of functional abstraction model layers provided by the cloud computing environment, according to some embodiments of the present disclosure.

FIG. 6 is a block diagram illustrating a set of functional abstraction model layers 600 provided by the cloud computing environment 500, according to some embodiments of the present disclosure. It should be understood in advance that the components, layers, and functions shown in FIG. 6 are intended to be illustrative only and embodiments of the invention are not limited thereto. As depicted, the following layers and corresponding functions are provided:

Hardware and software layer 610 includes hardware and software components. Examples of hardware components include: mainframes 611; RISC (Reduced Instruction Set Computer) architecture-based servers 612; servers 613; blade servers 614; storage devices 615; and networks and networking components 616. In some embodiments, software components include network application server software 617 and database software 618.

Virtualization layer 620 provides an abstraction layer from which the following examples of virtual entities may be provided: virtual servers 621; virtual storage 622; virtual networks 623, including virtual private networks; virtual applications and operating systems 624; and virtual clients 625.

In one example, management layer 630 provides the functions described below. Resource provisioning 631 provides dynamic procurement of computing resources and other resources that are utilized to perform tasks within the cloud computing environment. Metering and Pricing 632 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 633 provides access to the cloud computing environment for consumers and system administrators. Service level management 634 provides cloud computing resource allocation and management such that required service levels are met. Service Level Agreement (SLA) planning and fulfillment 635 provide pre-arrangement for, and procurement of, cloud computing resources for which a future requirement is anticipated in accordance with an SLA.

Workloads layer 640 provides examples of functionality for which the cloud computing environment can be utilized. Examples of workloads and functions that can be provided from this layer include: mapping and navigation 641; software development and lifecycle management 642; virtual classroom education delivery 643; data analytics processing 644; transaction processing 645; and temporary implementation of selected enterprise policies 646.

The present disclosure may be a system, a method, and/or a computer program product. The computer program product may include a computer readable storage medium (or media) having computer readable program instructions thereon for causing a processor to carry out aspects of the present disclosure.

The computer readable storage medium is a tangible device that can retain and store instructions for use by an instruction execution device. Examples of computer readable storage media can include an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a component, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the present disclosure.

What is claimed is:

1. A method comprising:
receiving current text data from a sender;
receiving a first set of historical text data for the sender;
determining emoji use preference of the sender;
analyzing the current text data for context that is representable by an emoji;
selecting a first emoji based the context, the first set of historical text data;
receiving a second set of historical text data for a recipient of the current text data;
analyzing a contextual meaning of the selected emoji based on the first set of historical text data and the second set of historical text data;
determining, based on the analyzing the contextual meaning of the selected emoji, that a second emoji would more closely match the context of the current text data;
sending the second emoji to the recipient; and
notifying the recipient that the emoji has been translated.

2. The method of claim 1 further comprising:
checking for a first personal profile of a sender.

3. The method of claim 2,
wherein the first personal profile of a sender includes previous text messages with emojis.

4. The method of claim 1, wherein the selecting further comprises:
prompting the sender to select the first emoji from a set of two or more emojis.

5. The method of claim 1, further comprising:
providing a meaning of the second emoji to the recipient.

6. The method of claim 1 further comprising:
identifying a regional profile for the sender, wherein the regional profile includes emoji trends in the sender's region; and
selecting the emoji trends in the regional profile.

7. A computer program product, the computer program product comprising a computer readable storage medium having program instructions embodied therewith, the program instructions executable by a computer to cause the computer to:
receive current text data from a sender;
receive a first set of historical text data for the sender;
determine emoji use preference of the sender;
analyze the current text data for context that is representable by an emoji;
select a first emoji based the context and the first set of historical text data;
receive a second set of historical text data for a recipient of the current text data;
analyze a contextual meaning of the selected emoji based on the first set of historical text data and the second set of historical text data;
determine, based on the analyzing the contextual meaning of the selected emoji, that a second emoji would more closely match the context of the current text data;
send the second emoji to the recipient; and
notify the recipient that the emoji has been translated.

8. The computer program product of claim 7 further comprising:
checking for a first personal profile of a sender.

9. The computer program product of claim 8,
wherein the first personal profile of a sender includes previous text messages with emojis.

10. The computer program product of claim 7, wherein the selecting further comprises:
prompting the sender to select the first emoji from a set of two or more emojis.

11. The computer program product of claim 7, further comprising: providing a meaning of the second emoji to the recipient.

12. The computer program product of claim 7 further comprising:
identify a regional profile for the sender, wherein the regional profile includes emoji trends in the sender's region; and
select the emoji trends in the regional profile.

13. A system comprising:
a processor; and a memory in communication with the processor, the memory containing program instructions that, when executed by the processor, are configured to cause the processor to perform a method, the method comprising:

receiving current text data from a sender;

receiving a first set of historical text data for the sender;

determining emoji use preference of the sender;

analyzing the current text data for context that is representable by an emoji;

selecting a first emoji based the context and the first set of historical text data;

receiving a second set of historical text data for a recipient of the current text data;

analyzing a contextual meaning of the selected emoji based on the first set of historical text data and the second set of historical text data;

determining, based on the analyzing the contextual meaning of the selected emoji, that a second emoji would more closely match the context of the current text data;

sending the second emoji to the recipient; and notifying the recipient that the emoji has been translated.

14. The system of claim 13 further comprising:
checking for a first personal profile of a sender.

15. The system of claim 14,
wherein the first personal profile of a sender includes previous text messages with emojis.

16. The system of claim 14, further comprising:
setting, based on the checking not returning a personal profile, a regional profile as the first personal profile.

17. The system of claim 13, wherein the selecting further comprises:
prompting the sender to select the first emoji from a set of two or more emojis.

* * * * *